United States Patent [19]
Kim

[11] Patent Number: 5,816,393
[45] Date of Patent: Oct. 6, 1998

[54] CD STORAGE MODULE

[76] Inventor: Dong J. Kim, 6147 Ibbetson Ave., Lakewood, Calif. 95713

[21] Appl. No.: 652,988

[22] Filed: May 24, 1996

[51] Int. Cl.[6] .................................................. B65D 85/30
[52] U.S. Cl. .................................... 206/307.1; 206/308.1; 206/309; 206/503
[58] Field of Search ............................... 206/307, 307.1, 206/308.1, 309, 311, 387.1, 387.15, 499, 503

[56] References Cited

U.S. PATENT DOCUMENTS

| | | | |
|---|---|---|---|
| 4,138,703 | 2/1979 | Stave et al. | 206/309 |
| 4,401,220 | 8/1983 | Kim . | |
| 4,655,345 | 4/1987 | Drake et al. | 206/308.1 |
| 4,707,247 | 11/1987 | Savoy | 206/307.1 |
| 4,741,438 | 5/1988 | Mastronardo et al. | 206/308.1 |
| 4,819,802 | 4/1989 | Gutierrez | 206/387.15 |
| 4,978,005 | 12/1990 | Sammet | 206/311 |
| 5,150,354 | 9/1992 | Iwata et al. | 206/308.1 |
| 5,244,084 | 9/1993 | Chan | 206/309 |
| 5,244,085 | 9/1993 | Lammerant et al. | 206/309 |
| 5,415,291 | 5/1995 | Fukagawa | 206/309 |
| 5,421,455 | 6/1995 | Clatanoff et al. | 206/499 |
| 5,544,741 | 8/1996 | Fantone et al. | 206/309 |
| 5,558,235 | 9/1996 | Hunt | 206/387.1 |

FOREIGN PATENT DOCUMENTS

| | | | |
|---|---|---|---|
| 330292 | 8/1989 | European Pat. Off. | 206/308.1 |
| 2134306 | 8/1984 | United Kingdom | 206/309 |

Primary Examiner—Paul T. Sewell
Assistant Examiner—Nhan T. Lam
Attorney, Agent, or Firm—Graybeal Jackson Haley LLP

[57] ABSTRACT

The present invention is a CD storage module (20) that includes an upper support (24) and a lower support (22) that are interconnectable horizontally and vertically, and individual CD storage cases (40). The CD storage cases (40) are insertable individually into the upper support (24) and the lower support (22). The CD storage case (40) includes a partition (44) and two outer covers (50 and 52). This configuration forms two compartments wherein a CD (62) may be placed in one compartment and an informational pamphlet placed in an opposite compartment. In the preferred embodiment of the present invention, the partition (46) and the outer covers (50 and 52) include bevels (76) for contacting only an outer periphery of a CD (62); the bevels (76) prevent scuffing or otherwise damaging a major surface area of the CD (62) as the CD (62) is being inserted and removed. In addition, the CD storage case (40) includes a CD storage case door (42) hingedly secured to the CD storage case (40). The CD storage case door (42) preferably includes at least one set of pincher forks (58) and pincher fork nubs (60), wherein when the door (42) is rotated from its substantially horizontal position to its substantially vertical position, the CD (62) is partially removed from the compartment to be readily grasped by the user.

17 Claims, 6 Drawing Sheets

CD STORAGE MODULE

BACKGROUND OF THE INVENTION

Field of the Invention

The present invention is a compact disk (CD) storage module that is expandable vertically and horizontally for increasing and decreasing the CD storage capacity as desired.

BACKGROUND

Compact disks (CDs) have become the preferred media for distribution of digitally recorded music and for distribution of computer software and computer data. Similar thin plastic digital recording disks of other sizes (another size of CD) are also used for video and for still photography, and they are becoming more popular. Users of CDs, especially for music and computer games, often have a large number of disks that must frequently be remounted into a player or CD-ROM drive. The current standard storage case, called a "jewel case", stores only one CD. Storage racks are sold which have slots for jewel cases. The user removes the jewel case from the rack, opens the jewel case, removes the CD, and then puts the empty jewel case somewhere, usually lying about.

Users need a storage case that allows easy access to a CD without removing the case for the individual CD from the rack, so the door should be in the edge of the case. In such a case of prior art design, it is difficult to grasp and remove a CD when other CDs or cases are close beside it in a rack. A mechanism for causing the CD to come forward is needed. Also, the individual cases should be removable when desired. There is a need that such a storage media holder be readily expandable horizontally and vertically to be customized by the user, minimizing the space used and providing adequate storage space and protection for storage media.

SUMMARY OF THE INVENTION

The present invention provides a storage module for storing CDs in individual cases, each with a mechanism for pulling out the CD. The present invention includes a modular storage module that may be expanded horizontally and vertically to readily fit within the space available for storing CDs.

The storage module of the present invention preferably includes horizontally interconnecting and vertically interlocking lower and upper supports having rails therein for slidably interlocking with individual CD storage cases or diskette holders. The lower and upper supports are horizontally expandable using male locking tabs and female locking slots, and vertically expandable using pegs and apertures for stacking individual storage modules one on top of the other. This expandable configuration enables the user to increase or decrease the CD storage capacity to accommodate the space available within the computer work environment.

The storage module of the present invention includes a storage case or diskette holder including two outer covers (or casings), a center partition (or web) and a storage case door. Each of the CD storage cases of the present invention is slidably interconnected with the upper support and the lower support. Accordingly, not only can individual CDs be inserted and removed, but individual CD storage cases can be removed from the storage module; this may facilitate having a protective case when a user desires to transport a CD.

The CD storage case door of the CD storage case is hingedly secured to a bottom portion of the CD storage case. The door is securely locked in position when in the vertical position using a tab and slot configuration. The door includes a pincher bar or removable plate having pincher forks secured thereto. When the door is closed, the pincher forks securely grasp a CD housed within the CD storage case without damaging the CD. When the door is hinged from the closed or vertical position to the open or horizontal position, the pinchers pull the CD partially from the CD storage case allowing the user to readily grasp the CD and remove it from the CD storage case. In the preferred embodiment, the pincher forks are laterally offset to the right or to the left with respect to the longitudinal axis of the door and pincher bar for readily grasping a CD stored on the right side or on the left side of the partition, respectively. The CD, according to the present invention, is positioned on one side of the partition and an informational display, often a folder paper brochure, may be positioned on the opposite side of the partition.

The CD storage case of the present invention further includes multiple bevels or bevel ramps positioned around the periphery of the interior of the CD storage case, specifically on the inside of the outer covers or casings and on both sides of the partition or web. When the CD is positioned within the storage case, the bevels ensure that only the outer edges of the CD contact the CD storage case; this aids in preventing scratching to protect data stored on the CD.

BRIEF DESCRIPTION OF THE DRAWINGS

A better understanding of the present invention and its attendant advantages may be obtained from the detailed description below of the preferred embodiment when taken in conjunction with the accompanying drawings wherein.

DESCRIPTION OF THE PREFERRED EMBODIMENT

The preferred embodiments of the present invention will be described as they relate to CD storage media. However, as will be readily apparent to those skilled in the art, design variations may be developed to accommodate other types of disk storage media, including video and photographic disks, where it is convenient to store a disk in a protective casing such that when a compartment door is opened the stored object is partially removed from the storage case. It will also be readily apparent to those skilled in the art that, while the preferred invention incorporates stacking apertures, stacking pegs, and interlocking tabs and slots to interconnect multiple storage modules for increased storage capacity vertically and horizontally, those skilled in the art may readily incorporate other types of interlocking methods, including snaps, rivets, pins, etc.; these variations are all intended to fall within the purview of the present invention. The present invention is intended to cover the expansion of a storage module wherein one storage module is interlocked with another storage module horizontally and/or vertically until a desired height, width and/or storage capacity is reached.

Figure 1:
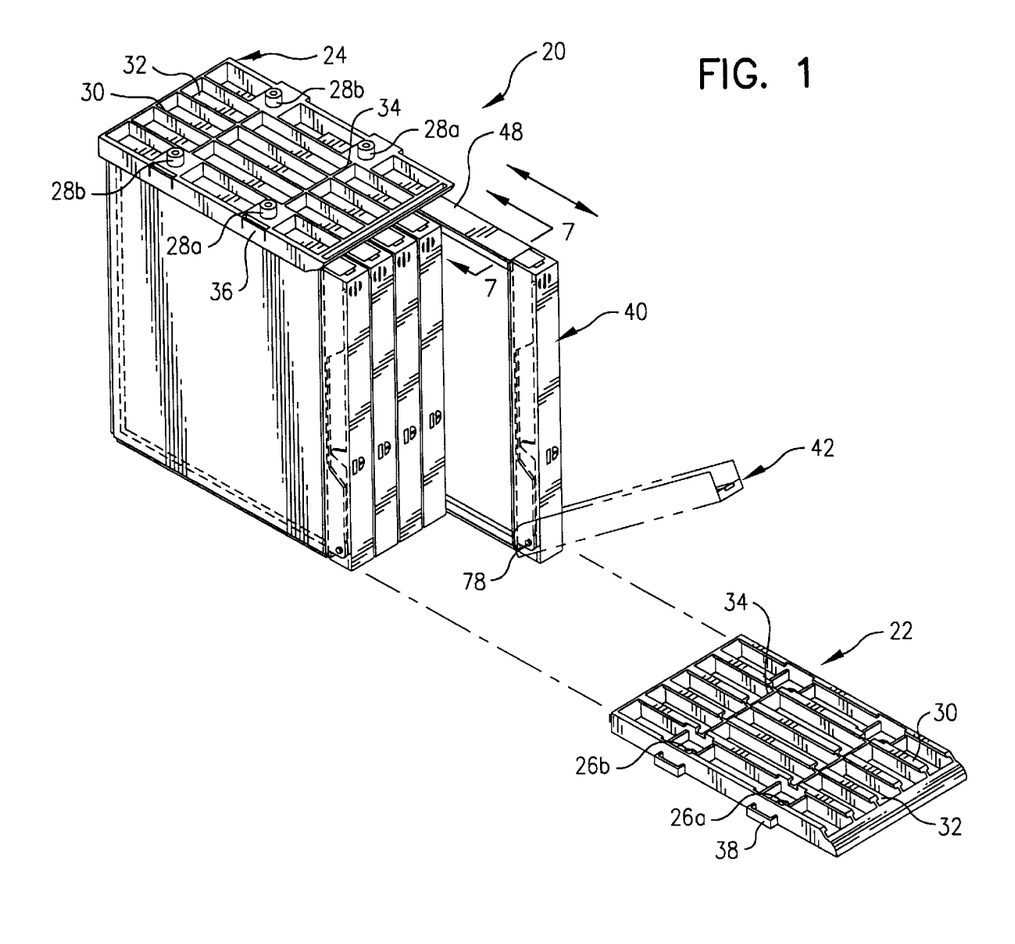
FIG. 1 is a top front perspective view of a storage module according to the present invention showing a lower support exploded away from the storage module and one CD storage case partially removed.

Referring now to FIG. 1, there is shown a front perspective view of the present invention, specifically, five CD storage cases or diskette holders 40 matingly engaged within an upper support 24 and a lower support 22 which is exploded away for illustrative purposes. As can be seen in FIG. 1, the upper support 24 preferably includes front stacking pegs 28a and rear stacking pegs 28b. These stacking pegs 28a and 28b are dimensioned to matingly engage front stacking aperture 26a and rear stacking aperture 26b, respectively, of the lower support 22. In this regard, storage modules 20 may be stacked one on top of the other until a desired height and/or storage capacity is reached.

Figure 9:
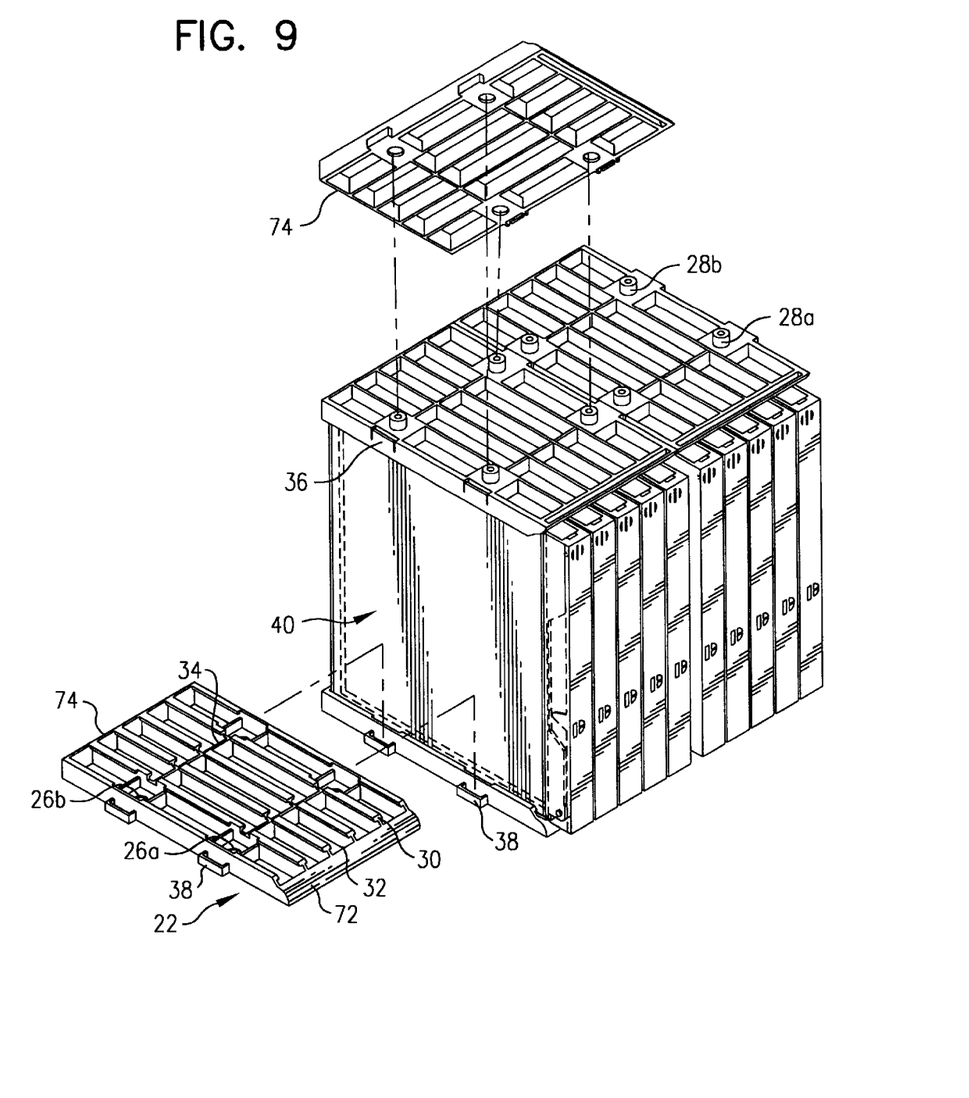
FIG. 9 is a front perspective view of the storage module of the present invention illustrating the horizontal and vertical interlocking relationship of the lower supports and the upper supports.

In addition, the lower support 22 and the upper support 24 include male locking tabs 36 and female locking slots 38 on opposing sides. As illustrated more clearly in FIG. 9, the male locking tabs 36 and the female locking slots 38 may be interconnected to horizontally link storage modules together thereby increasing the storage capacity of the storage module.

Finally, and as is also shown in FIG. 1, in the preferred embodiment of the present invention, the lower support 22 and the upper support 24 include T-rails or support rails 30 equally spaced and running longitudinally along the lower support 22 and the upper support 24. A channel 32 is formed between each pair of T-rails 30. The T-rails 30 of the upper support 24 and the lower support 22 matingly engage with the upper rails 48 and the lower rails (not shown) of the CD storage case 40, respectively. The T-rails 30 are interconnected and strengthened with webs 34, the rearwardmost web 34 being flush with the T-rails 30 to impede the rearward movement of the CD storage case 40.

Figure 2:
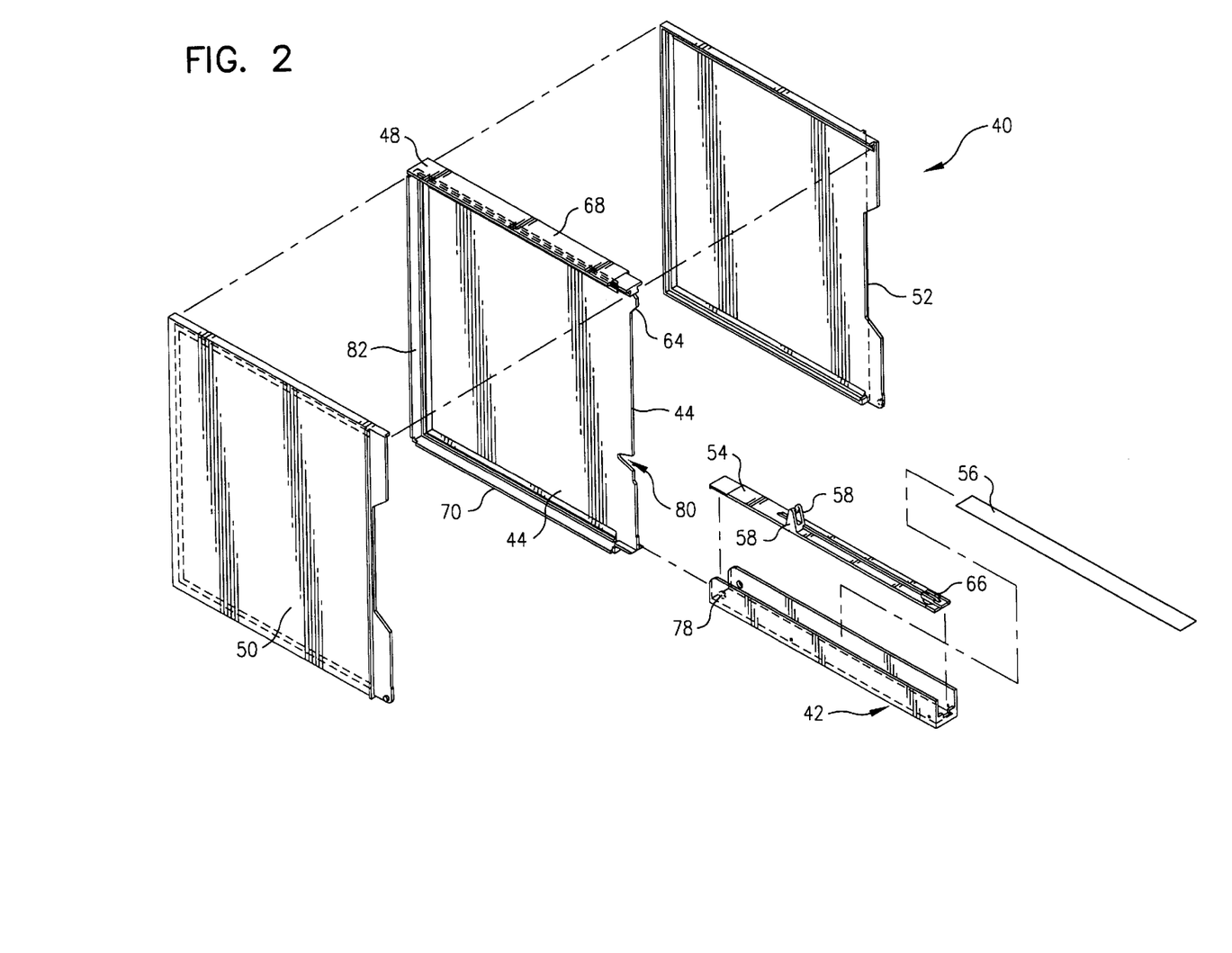
FIG. 2 is a front exploded perspective view of a CD storage case illustrating the preferred components of the CD storage case.

Referring now to FIG. 2, there is shown an exploded view of the CD storage case 40. The main portion of the CD storage case 40 preferably includes a left cover or casing 50, a right cover or casing 52, and a partition or web 44. In the preferred embodiment of the present invention, the left cover 50 and the right cover 52 are transparent allowing the user to visually inspect both the CD and any informational pamphlet that may be relevant to the CD. The partition 44, in combination with the left cover 50 and the right cover 52, forms two storage compartments. In the preferred embodiment, the storage compartment formed between the left cover 50 and the partition 44 is for storing the CD, and the storage compartment formed between the right cover 52 and the partition 44 is for storing an informational pamphlet associated with the CD. These compartments may be readily interchanged depending on specific applications; this will be readily apparent to those skilled in the art.

Figures 3, 6, 7:
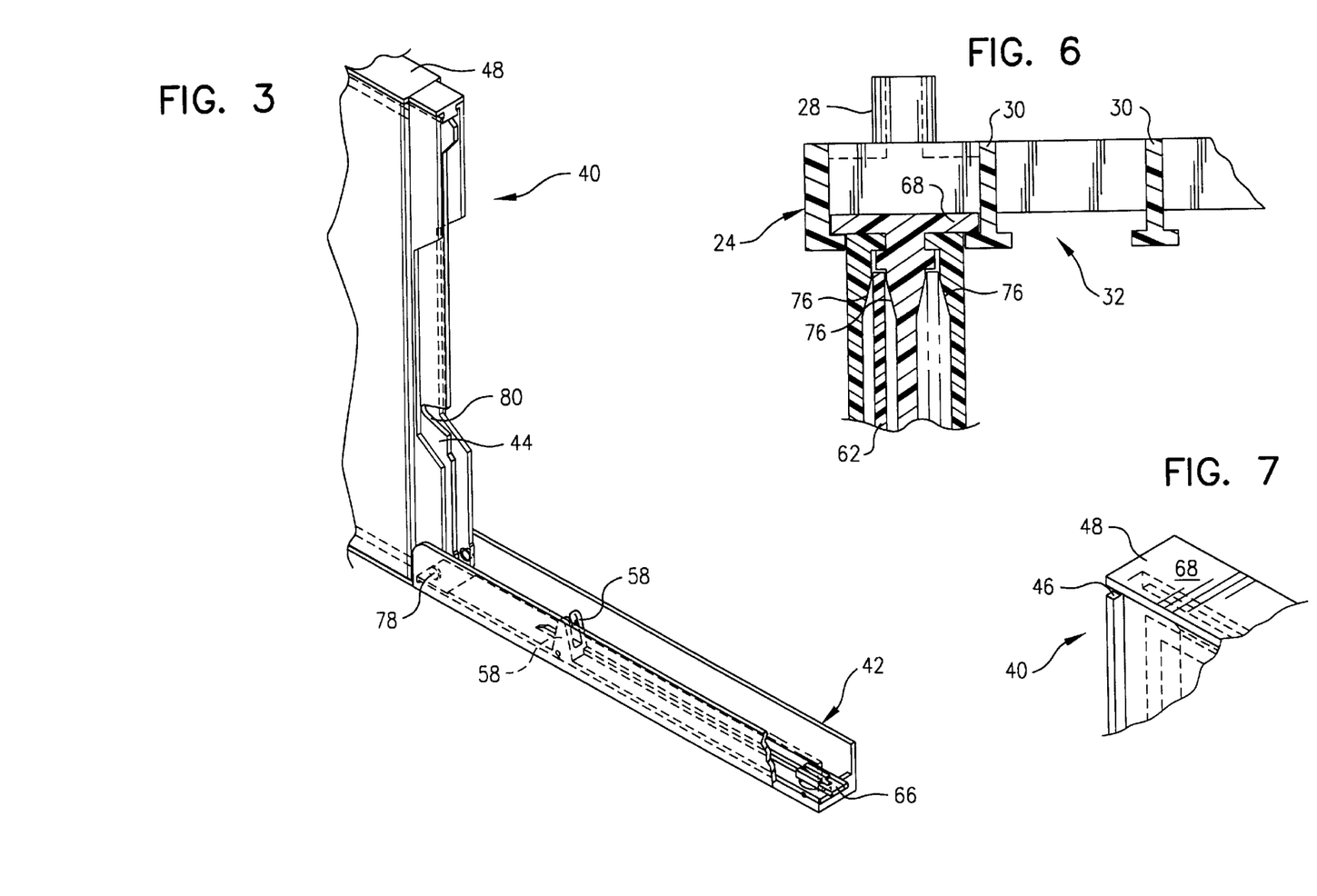
FIG. 3 is a front perspective view of the CD storage case of the present invention showing a CD storage case door hingedly attached to a lower portion of the CD storage case.
FIG. 6 is an elevational view of the present invention illustrating the CD storage case matingly engaged within an upper support having a stacking peg positioned thereon.
FIG. 7 is an enlarged perspective view of a rear corner of the CD storage case, showing a notch for matingly engaging with T-rails or support rails on either the upper support and/or the lower support.
Figure 4:
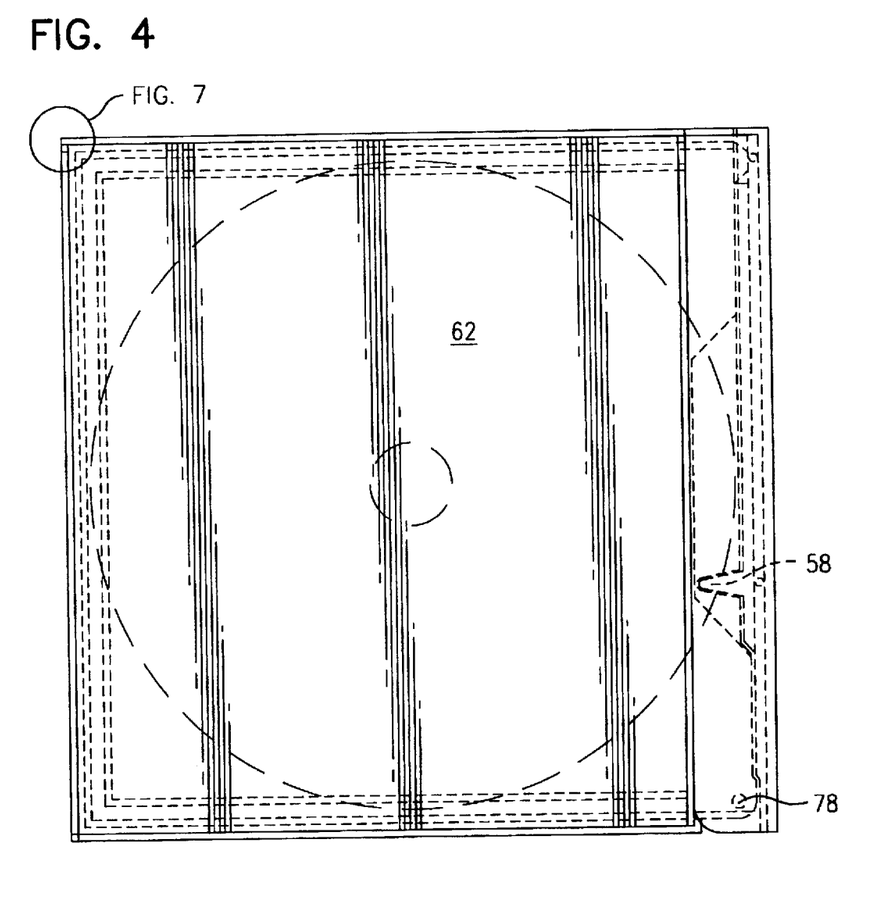
FIG. 4 is a side elevational view of the CD storage case of the present invention.
Figure 5:
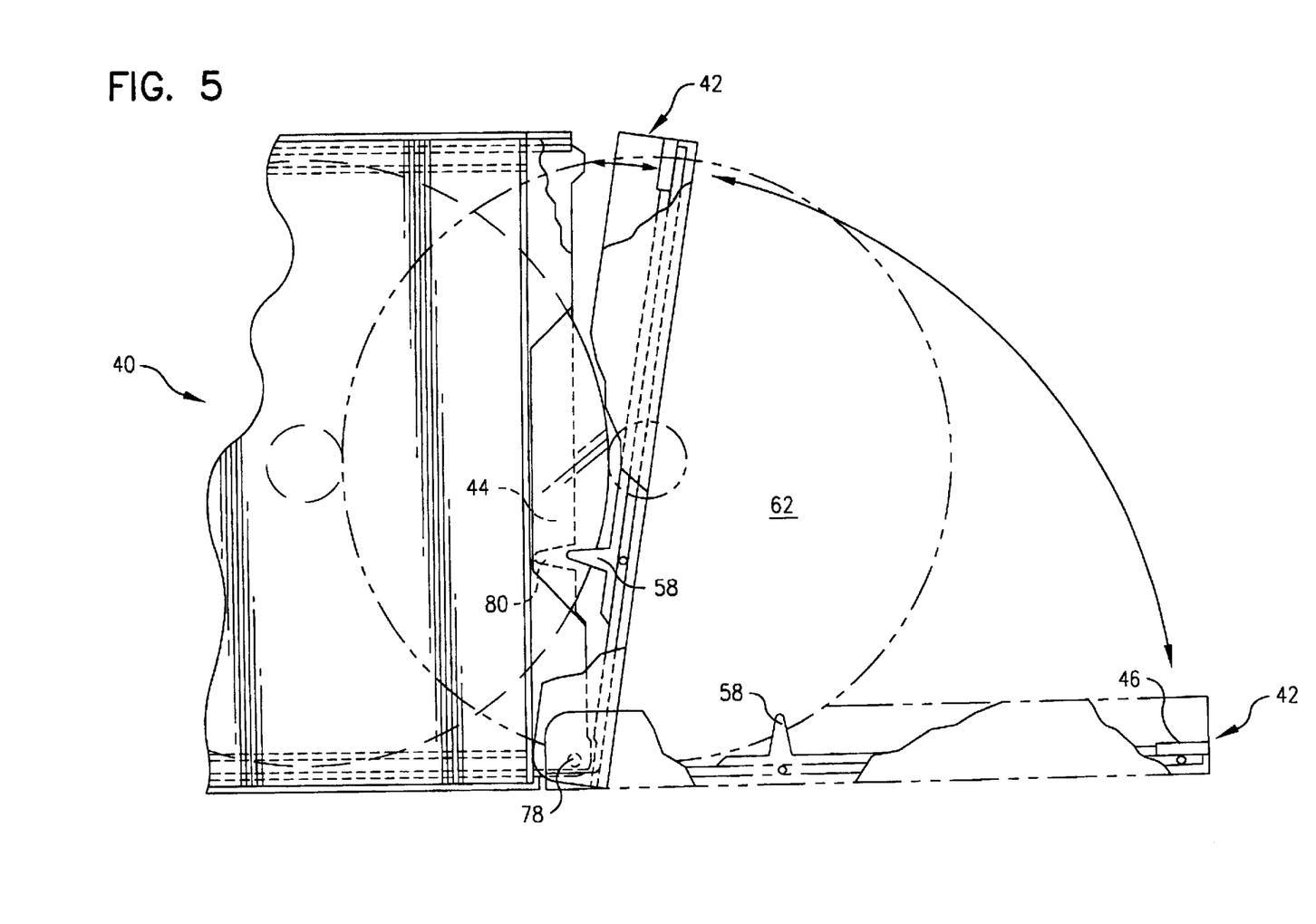
FIG. 5 is an elevational view of the CD storage case of the present invention illustrating the rotation of the CD storage case door from a substantially vertical position to a substantially horizontal position wherein the pincher forks remove the CD from the CD storage case.

The CD storage case 40 also includes a CD storage case door 42 hingedly attached to the main portion of the CD storage case. In the preferred embodiment, the storage case door 42 is a unshaped configuration but, as will be apparent to those skilled in the art, may be any suitable shape for a given application. The door 42 preferably includes a pincher bar or removable plate 54 (to be described in greater detail below) and an ID plaque or title plate 56. As best shown in FIG. 3 and FIG. 5, the door 42 hinges about a lower hinge point 78 from its substantially vertical position to its substantially horizontal position. The hinge point 78 may include a pin secured to the outer covering 50 and 52 for matingly engaging with an aperture in the lower portion of the door 42. In cooperation with the pincher bar 54, when the door 42 is hinged from the substantially vertical position to the substantially horizontal position, the CD is partially removed (described in greater detail below) from the CD storage case 40 to be readily grasped by the user.

Figure 8:
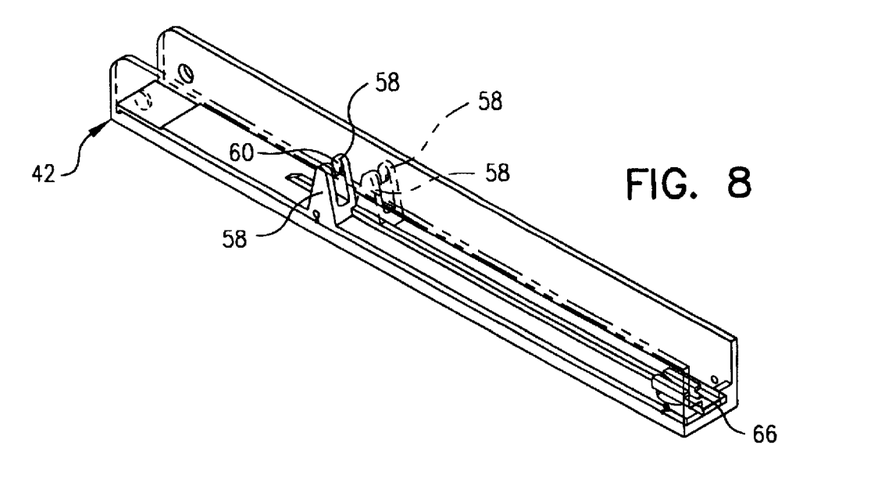
FIG. 8 is a perspective view of the CD storage case door illustrating a preferred positioning of the pincher forks in solid lines and an alternative positioning of the pincher forks in dashed lines, or wherein dual pincher forks are used, how the pincher forks may be cooperatively positioned on the pincher bar.

Referring now to FIG. 8, there is shown an enlarged detail view of the door 42, the pincher bar (removable plate) the pincher forks 58 and pincher nubs or ramps 60, and an alternative positioning of the pincher forks 58. The pincher bar 54 may include a plurality of pincher forks 58. Each pincher fork 58 preferably includes a pincher nub or ramp 60 positioned thereon. The spacing between opposing pincher nubs 60 is slightly less than a width dimension of a conventional CD. The pincher nubs 60 are configured as gentle ramps, wherein when a CD is forced between the pincher nubs 60 (assumably by closing the CD storage case door 42 with a CD 62 in the left compartment), the pincher nubs 60 gently spread the pincher forks 58 without damaging either the CD or the pincher forks 58. Accordingly, the CD is held in detention between the pincher forks 58, specifically the pincher nubs 60, and is thus semi-secured to the CD storage case door 42. Particularly, a portion of the outer periphery of the CD 62 is held in tension between the pincher forks 58. As the CD storage case door 42 is hinged from its substantially vertical position to its substantially horizontal position, the CD 62 slides substantially horizontally along a ledge of the partition 44 and is removed partially from the CD storage case 40 to be easily grasped by the user.

FIG. 8 further shows an alternative embodiment of the CD storage case door 42 of the present invention. In this embodiment, because it may be advantageous to store a CD on the right side of the partition or web 44, the pincher forks 58 and the pincher nubs 60 may be offset to the right of the pincher bar 54. In addition, the CD storage case door 42 may include two sets of pincher forks 58 and pincher nubs 60; this configuration may be advantageous where two CDs 62 are desired to be stored together in one CD storage case 40 or wherein it is desirable to increase the overall capacity of the storage module 20.

Referring back to FIG. 2, the partition 44 includes a notch 80 and a locking tab 64. The notch 80 provides a clearance area for the pincher forks 58 to pass into when the CD storage case door 42 is hinged into its substantially vertical position. In this regard, the CD 62, when slid into the compartment formed between the left cover 50 and the partition 44, butts against a rear rail 82 of the partition 44, an outer peripheral portion of the CD extending along side notch 80. When the CD storage case door 42 is hinged into its substantially vertical position, as the pincher forks 58 and pincher nubs 60 pass into the notch 80 the pincher forks 58, in combination with the pincher nubs 60, grasp the outer periphery of the CD.

The locking tab 64 of the partition is configured to fit within a locking channel 66 formed within an upper portion of the pincher bar 54. Once the CD storage case door 42 is hinged to its substantially vertical position, the CD storage case door 42 is locked in position by the tension fit of the locking tab 64 into the locking channel 66, and will not inadvertently open when the storage module 20 is rotated to an other than upright position.

Also shown in FIG. 2 is a top rail or upper wall 68, a bottom rail or lower wall 70 and a rear rail or back wall 82 of the partition or web 44. As can be seen in FIG. 6 and FIG. 7, the top rail 68 is configured to matingly engage the T-rails 30 in the supports 22 and 24. While FIG. 6 shows only an upper portion of the CD storage case 42, the lower portion is a mirror image of the upper portion. To facilitate the insertion of the CD storage cases 40 between the T-rails 30, both the lower support 22 and the upper support 24 include ramps 72; this can best be seen in FIG. 1 and FIG. 9. As can be seen in FIG. 7, the rear rail 82 of the partition 44 includes an upper notch 46 and a lower notch (not shown) to provide clearance for the T-rails 30 when the CD storage case 40 is matingly engaging with the upper support 24 and the lower support 22.

Referring again to FIG. 6, another aspect of the present invention is shown, specifically bevel ramps 76 positioned on the outer periphery of the outer covers or casings 50 and 52, and on the outer periphery of either side of the partition or web 44. These bevel ramps 76 are configured such that when the CD 62 is inserted into the compartment formed between the outer cover 50 (or 52) and the partition 44, only the outer most periphery of the CD 62 contacts the bevel ramps 76. In this regard, a substantial portion of the CD surface area, presumably that area containing the stored data, does not brush across or otherwise come into contact with either of the covers 50 or 52, or with the partition 44. Accordingly, the CD 62 is slid into and out of the compartment without scuffing the center portion of the CD 62.

While the preferred embodiments are disclosed in the drawings and described, it will be readily apparent to those skilled in the art how various modifications to the present invention may be more adaptable to alternative environments. Such modifications are all intended to fall within the purview of the present invention.

I claim:

1. A modular storage apparatus for storing a plurality of diskettes, comprising:
   (a) a lower support having a plurality of parallel disposed lower support rails running longitudinally within said lower support;
   (b) an upper support having a plurality of parallel disposed upper support rails running longitudinally within said upper support, wherein said lower support rails and said upper support rails are aligned when said lower support and said upper support are opposed one another with the lower support rails and the upper support rails facing one another;
   (c) a diskette holder having a lower wall, an upper wall and a back wall, and a web interconnecting and substantially perpendicular to the lower wall, the upper wall and the back wall, said lower wall slidably engaging at least one of said lower support rails, and said upper wall slidably engaging at least one of said upper support rails;
   (d) two outer casings perpendicular to said lower wall, said upper wall and said back wall, and substantially parallel to said web, the outer casings providing outer protective coverings for at least one of said plurality of diskettes;
   (e) a door for securing said diskette between said lower wall, said upper wall, said back wall, said web and at least one of said two outer casings, said door comprising at least one pair of pincher forks secured to a lower portion of the door, the pincher forks having a base end and a pincher end, the base end secured to the door and the pincher end protruding into the compartment when the door is in the substantially closed position, the pincher forks having a gap therebetween that is less than a width dimension of a diskette, wherein when the diskette is placed in the compartment and the door is closed, the disckette is secured between the pincher forks ond secured to the door, wherein when the door is moved from the substantially closed position to the substantially open position, the pincher forks partially pull the diskette from the compartment to be easily grasped by the user;
   (f) a hinge allowing said door to rotate from a substantially closed position wherein said door is substantially perpendicular to said lower wall and said upper wall, and substantially parallel to said back wall, thereby forming a compartment for storing said diskette to a substantially open position wherein said door is substantially an extension of said lower wall.

2. The modular storage apparatus of claim 1, wherein the door is a U-shape configuration having at least one aperture in a bottom portion of said door and wherein at least one pin for matingly engaging with the at least one aperture in the door is positioned on a bottom portion of the outer casing, the aperture and the pin forming the hinge for rotating the door from the closed position to the open position.

3. The modular storage apparatus of claim 1, wherein the door further comprises a locking means secured to an upper portion of the door, wherein, when the door is in the closed position, the door is secured in place requiring a reasonable force to begin the movement of the door from the closed position to the open position.

4. The modular storage apparatus of claim 1, wherein the at least one pair of pincher forks is secured to a removable plate, the removable plate being configured to lock within the door sandwiching a title plate between the door and the removable plate, the title plate for placing thereon identifying comments related to the diskette.

5. The modular storage apparatus of claim 1, wherein each pincher fork further comprises a ramp, the space between the ramp on one pincher fork and the ramp on the opposing pincher fork being slightly less than the dimension of the diskette, wherein when a diskette is inserted between the ramps on the ends of the pincher forks, the pincher forks elastically expand to apply pressure against an outer periphery of the diskette.

6. A modular storage apparatus for storing a plurality of diskettes, comprising:
   (a) a lower support having a plurality of parallel disposed lower support rails running longitudinally within said lower support;
   (b) an upper support having a plurality of parallel disposed upper support rails running longitudinally within said upper support, wherein said lower support rails and said upper support rails are aligned when said lower support and said upper support are opposed to one another with the lower support rails and the upper support rails facing one another;

(c) a diskette holder having a lower wall, an upper wall and a back wall, and a web interconnecting and substantially perpendicular to the lower wall, the upper wall and the back wall, said lower wall slidably engaging at least one of said lower support rails, and said upper wall slidably engaging at least one of said upper support rails;

(d) two outer casings perpendicular to said lower wall, said upper wall and said back wall, and substantially parallel to said web, the outer casings providing outer protective coverings for at least one of said plurality of diskettes;

(e) a door for securing said diskette between said lower wall, said upper wall, said back wall, said web and at least one of said two outer casings;

(f) a hinge allowing said door to rotate from a substantially closed position wherein said door is substantially perpendicular to said lower wall and said upper wall, and substantially parallel to said back wall, thereby forming a compartment for storing said diskette to a substantially open position wherein said door is substantially an extension of said lower wall, wherein the lower support further comprises a plurality of apertures and wherein the upper support further comprises a plurality of pegs, the apertures of the lower support and the pegs of the upper support being configured to align with one another and the pegs of the upper support being dimensioned to slidably fit within the apertures of the lower support, wherein multiple storage modules can be stacked one on top of the other by inserting the pegs into the apertures, to increase the diskette storage capacity.

7. The modular storage apparatus of claim 1, wherein the lower support further comprises a plurality of tabs on one side of the lower support and a plurality of slots on an opposing side of the lower support, and wherein the upper support similarly comprises a plurality of tabs on one side of the upper support and a plurality of slots on an opposing side of the upper support, wherein when the upper support and the lower support are positioned to slidably receive the lower wall and the upper wall respectively, the tabs of the lower support are below the tabs of the upper support and the slots of the lower support are below the slots of the upper support such that a second modular storage apparatus having a lower support and an upper support may be interconnected to the first modular storage apparatus, the tabs interlocking within the slots.

8. A diskette holder for storing a diskette, comprising:
(a) a lower wall, an upper wall and a back wall;
(b) two outer casings perpendicular to said lower wall, said upper wall and said back wall, at least one of said outer casings providing an outer protective covering for said diskette;
(c) a door for securing said diskette between said lower wall, said upper wall, said back wall, and at least one of said two outer casings;
(d) a hinge allowing said door to rotate from a substantially closed position wherein said door is substantially perpendicular to said lower wall and said upper wall, and substantially parallel to said back wall, thereby forming a compartment for storing a diskette, to a substantially open position wherein said door is substantially an extension of said lower wall; and
(e) at least one pair of pincher forks secured to a lower portion of the door, the pincher forks having a base end and a pincher end, the base end secured to the door and the pincher end protruding into the compartment, when the door is in the substantially closed position the pincher forks having gap therebetween that is less than a width dimension of a diskette, wherein when the diskette is placed in the compartment and the door is closed, the diskette is secured between the pincher forks and secured to the door, wherein when the door is moved from the substantially closed position to the substantially open position, the pincher forks partially pull the diskette from the compartment to be easily grasped by a user.

9. The diskette holder of claim 8, wherein the door is a U-shape configuration having at least one aperture in a bottom portion of said door and wherein at least one pin for matingly engaging with the at least one aperture in the door is positioned on a bottom portion of the outer casing, the aperture and the pin forming the hinge for rotating the door from the closed position to the open position.

10. The diskette holder of claim 8, wherein the door further comprises a locking means secured to an upper portion of the door, wherein, when the door is in the closed position, the door is secured in place requiring a reasonable force to begin the movement of the door from the closed position to the open position.

11. The diskette holder of claim 8, wherein the at least one pair of pincher forks is secured to a removable plate, the removable plate being configured to lock within the door sandwiching a title plate between the door and the removable plate, the title plate for placing thereon identifying comments related to the diskette.

12. The diskette holder of claim 8, wherein each pincher fork further comprises a ramp, the space between the ramp on one pincher fork and the ramp on the opposing pincher fork being slightly less than the dimension of the diskette, wherein when a diskette is inserted between the ramps on the ends of the pincher forks, the pincher forks elastically expand to apply pressure against an outer periphery of the diskette.

13. A diskette holder for storing a diskette, comprising:
(a) a lower wall, an upper wall and a back wall, and a web interconnecting and substantially perpendicular to the lower wall, the upper wall, and the back wall;
(b) two outer casings perpendicular to said lower wall, said upper wall and said back wall, and substantially parallel to said web, at least one of said outer casings providing an outer protective covering for said diskette;
(c) a door for securing said diskette between said lower wall, said upper wall, said back wall, said web and at least one of said two outer casings;
(d) a hinge allowing said door to rotate from a substantially closed position wherein said door is substantially perpendicular to said lower wall and said upper wall, and substantially parallel to said back wall, thereby forming a compartment for storing a diskette, to a substantially open position wherein said door is substantially an extension of said lower wall; and
(e) at least one pair of pincher forks secured to a lower portion of the door, the pincher forks having a base end and a pincher end, the base end secured to the door and the pincher end protruding into the compartment, when the door is in the substantially closed position the pincher forks having a gap therebetween that is less than a width dimension of a diskette, wherein when the diskette is placed in the compartment and the door is closed, the diskette is secured between the pincher forks and secured to the door, wherein when the door is moved from the substantially closed position to the substantially open position, the pincher forks partially null the diskette from the compartment to be easily grasped by a user.

14. The diskette holder of claim 13, wherein the door is a U-shape configuration having at least one aperture in a bottom portion of said door and wherein at least one pin for matingly engaging with the at least one aperture in the door is positioned on a bottom portion of the outer casing, the aperture and the pin forming the hinge for rotating the door from the closed position to the open position.

15. The diskette holder of claim 13, wherein the door further comprises a locking means secured to an upper portion of the door, wherein, when the door is in the closed position, the door is secured in place requiring a reasonable force to begin the movement of the door from the closed position to the open position.

16. The diskette holder of claim 13, wherein the at least one pair of pincher forks is secured to a removable plate, the removable plate being configured to lock within the door sandwiching a title plate between the door and the removable plate, the title plate for placing thereon identifying comments related to the diskette.

17. The diskette holder of claim 13, wherein each pincher fork further comprises a ramp, the space between the ramp on one pincher fork and the ramp on the opposing pincher fork being slightly less than the dimension of the diskette, wherein when a diskette is inserted between the ramps on the ends of the pincher forks, the pincher forks elastically expand to apply pressure against an outer periphery of the diskette.

\* \* \* \* \*

UNITED STATES PATENT AND TRADEMARK OFFICE
CERTIFICATE OF CORRECTION

PATENT NO. : 5,816,393
DATED : October 6, 1998
INVENTOR(S) : Dong J. Kim

It is certified that error appears in the above-indentified patent and that said Letters Patent is hereby corrected as shown below:

In claim 1, line 10, please insert --to-- between "opposed" and "one".

In claim 1, line 37, please delete "ond" and insert --and--.

In claim 7, line 1, please delete "1" and insert --6--.

In claim 8, line 22, please insert --a-- between "having" and "gap".

In claim 13, line 31, please delete "null" and insert --pull--.

Claim 1, line 36, "disckette" should read --diskette--

Signed and Sealed this

Sixteenth Day of February, 1999

Attest:

Attesting Officer

*Acting Commissioner of Patents and Trademarks*